United States Patent
Goto

(10) Patent No.: US 11,535,716 B2
(45) Date of Patent: *Dec. 27, 2022

(54) (METH)ACRYLIC-MODIFIED SILOXANE COMPOUND

(71) Applicant: SHIN-ETSU CHEMICAL CO., LTD., Tokyo (JP)

(72) Inventor: Tomoyuki Goto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 497 days.

This patent is subject to a terminal disclaimer.

(21) Appl. No.: 16/498,989

(22) PCT Filed: Mar. 29, 2018

(86) PCT No.: PCT/JP2018/013095
§ 371 (c)(1),
(2) Date: Sep. 27, 2019

(87) PCT Pub. No.: WO2018/181650
PCT Pub. Date: Oct. 4, 2018

(65) Prior Publication Data
US 2020/0055990 A1 Feb. 20, 2020

(30) Foreign Application Priority Data

Mar. 29, 2017 (JP) .............................. JP2017-064219

(51) Int. Cl.
*C08G 77/38* (2006.01)
*C09D 7/65* (2018.01)
*C08G 77/20* (2006.01)

(52) U.S. Cl.
CPC ............. *C08G 77/38* (2013.01); *C08G 77/20* (2013.01); *C09D 7/65* (2018.01)

(58) Field of Classification Search
CPC .... C07F 7/0838; C09D 5/1675; C09D 143/04
See application file for complete search history.

(56) References Cited

U.S. PATENT DOCUMENTS

| | | | |
|---|---|---|---|
| 2006/0142414 A1 | 6/2006 | Hudd et al. | |
| 2011/0092660 A1 | 4/2011 | Okawa et al. | |
| 2013/0303682 A1 | 11/2013 | Konda et al. | |
| 2020/0010697 A1* | 1/2020 | Taniguchi | ............ C09D 143/04 |

FOREIGN PATENT DOCUMENTS

| | | | | |
|---|---|---|---|---|
| EP | 0130731 A2 | 1/1985 | | |
| JP | 4154941 B2 | 9/2008 | | |
| JP | 4801901 B2 | 10/2011 | | |
| JP | 2012-167185 A | 9/2012 | | |
| JP | 5584868 B2 | 9/2014 | | |
| JP | 2014-210871 A | 11/2014 | | |
| JP | 2016-160280 A | 9/2016 | | |
| JP | 2017-065457 | * | 3/2017 | |
| WO | WO 2012/111286 | * | 8/2012 | .......... C08F 290/148 |
| WO | WO 2012/111286 A1 | 8/2012 | | |
| WO | WO 2016/002670 A1 | 1/2016 | | |

OTHER PUBLICATIONS

International Search Report (PCT/ISA/210) issued in PCT/JP2018/013095, dated Jun. 19, 2018.
Written Opinion (PCT/ISA/237) issued in PCT/JP2018/013095, dated Jun. 19, 2018.
Extended European Search Report, dated Nov. 27, 2020, for European Application No. 18777865.9.

* cited by examiner

*Primary Examiner* — Pancham Bakshi
(74) *Attorney, Agent, or Firm* — Birch, Stewart, Kolasch & Birch, LLP

(57) ABSTRACT

The present, invention aims to provide an additive which has a reactive group with good active energy ray curability. When incorporated in a paint, the additive does not bleed over time and imparts an excellent leveling property and a defoaming property to the paint.
There is provided a (meth)acrylic-modified siloxane compound of formula (a1) which has, as a branch and, optionally, at one or both of the terminals, of a linear polysiloxane backbone, a specific number of moieties having a (meth)acryloyl group at a terminal and a (poly)oxyalkylene structure of the formula $-(C_aH_{2a}O)_b-$. Also provided is an additive for paints, comprising said (meth)acrylic-modified siloxane compound.

15 Claims, No Drawings

(METH)ACRYLIC-MODIFIED SILOXANE COMPOUND

TECHNICAL FIELD

The present invention relates to a (meth)acrylic-modified siloxane having a specific structure. In particular, it relates to an additive for paints (e.g., printing ink, topcoat agent) having a good leveling property, a defoaming property and reactivity.

BACKGROUND ART

In recent years, active energy ray-curable paints have been increasingly used, because of their advantages, such as reduced costs owing to simplification of a drying step, and a reduced amount of volatile solvents as an environmental countermeasure. Conventional applications of such paints include printing inks and topcoat agents. The active energy ray-curable printing inks are used in a wide variety of fields, as screen printing inks and inkjet printing inks, because of their enhanced printing speed, applicability for various substrates and good water resistance.

For instance, Patent 1 discloses an ink having improved dispersibility of pigments; Patent Literature 2 discloses an ink having improved curability; Patent Literature 3 discloses an ink attaining good print head performance and wettability, and mentions a variety of additives. Also, Patent Literature 4 discloses an ink having an improved leveling property.

However, none of these documents refers to an additive having both of an excellent leveling property and an excellent defoaming property. Further, additives having no reactive group may cause a problem of bleeding over time.

LIST OF THE PRIOR ART

Patent Literatures

Patent Literature 1: JP 4154941-B2
Patent Literature 2: JP 2016-160280-A
Patent Literature 3: JP 4801901-B2
Patent Literature 4: JP 5584868-B2

SUMMARY OF THE INVENTION

The present invention aims to provide an additive which has a reactive group with good, active energy ray curability. When incorporated in paint, the additive does not bleed over time and imparts an excellent leveling property to the paint. The present invention also aims to provide an additive which imparts a combination of an excellent leveling property and an excellent defoaming property.

The present invention provides a (meth)acrylic-modified siloxane compound of the following formula (a1):

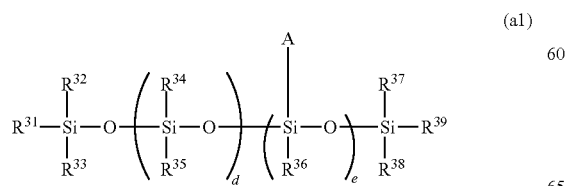

(a1)

wherein A is a group of the following formula (a2):

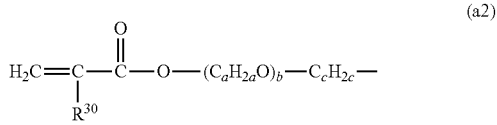

(a2)

wherein $R^{30}$ is a hydrogen atom or a methyl group; a is an integer of 2 to 5; b is an integer of 0 to 50; and c is an integer of 0 to 18, provided that c is an integer of 5 to 12 when b=0; wherein d is an integer of 1 to 500; e is an integer of 1 to 30; $R^{31}$ and $R^{39}$ are, independently from each other, an alkoxy group, A as defined above, or a substituted or unsubstituted monovalent hydrocarbon group having no (meth)acrylic group; and $R^{32}$-$R^{38}$ are, independently from each other, a substituted or unsubstituted monovalent hydrocarbon group having no (meth)acrylic group, or an alkoxy group, with the proviso that e is an integer of 3 to 30 when none of $R^{31}$ and $R^{39}$ is A.

The siloxane compound according to the invention may be used as an additive for paints. By using the compound as an additive, an ink has an excellent leveling property without causing bleeding of the additive over time. Further, an ink having a combination of an excellent leveling property and an excellent defoaming property can be provided. The siloxane compound according to the invention imparts an excellent antifouling property when used as a topcoat agent.

DETAILED DESCRIPTION OF THE PREFERRED EMBODIMENTS

The (meth)acrylic-modified siloxane compound according to the invention is represented by the formula (a1) shown above, and will be described in more detail.

In formula (a1), d is an integer of 1 to 500, preferably an integer of 10 to 400, and more preferably an integer of 20 to 300. If d exceeds 500, the compound may have reduced compatibility with other paint components, or may cause a reduced leveling property.

In formula (a1), e is an integer of 1 to 30, preferably an integer of 1 to 20, and, more preferably an integer of 3 to 15. The polymerization reactivity will be insufficient if e is 0. Even if e exceeds 30, no noticeable improvement in the reactivity is attained, but rather the defoaming property may be adversely affected.

In formula (a1), when none of $R^{31}$ and $R^{39}$ is A, e is an integer of at least 3, preferably an integer of at least 4, more preferably an integer of at least 6. When either one of $R^{31}$ and $R^{39}$ is A, e is preferably an integer of at least 2. When both of $R^{31}$ and $R^{39}$ are A, e may be an integer of at least 1. The upper limit of e is as described above.

In formula (a1), d+e is preferably from 2 to 500, more preferably from 20 to 400, and especially from 30 to 300.

In formula (a1), A is a group of the following formula (a2):

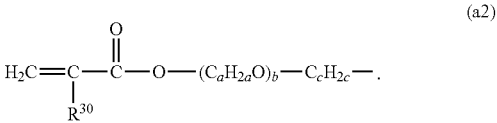

(a2)

In formula (a2), $R^{30}$ is a hydrogen atom or a methyl group.

In formula (a2), a is an integer of 2 to 5, preferably an integer of 2 to 4 in view of the availability of the starting material.

In formula (a2), b is an integer of 0 to 50, preferably an integer of 0 to 30, more preferably 0 or 1 to 20, even more preferably 0 or 1 to 10, and especially preferably 0 or 1 to 3. Most preferably, b is 1, 2 or 3. If b exceeds 50, the compound has a low content of the siloxane moiety, resulting in reduced defoaming property when the compound is used as a paint additive.

The amount of the oxyalkylene moiety of the formula —$(C_aH_{2a}O)_b$— in the whole molecule is preferably less than 25% by weight, more preferably less than 20% by weight, and especially preferably less than 10% by weight. If the amount exceeds the upper limit indicated above, the paint containing the compound as an additive may exhibit a reduced defoaming property.

In formula (a2) c is an integer of 0 to 18, preferably 2 to 15, and more preferably 3 to 12. When b is 0, however, c is an integer of 5 to 12.

The compound according to the invention preferably has 3 to 30, more preferably 3 to 20, and especially preferably 5 to 20, of A per molecule.

One preferable embodiment of the invention is a compound of formula (a1), wherein b is an integer of 1 to 20, c is an integer of 3 to 12, and e is an integer of 1 to 20. It is preferable that e has such a value that the number of A is 3 to 22 per molecule. It is more e that a is an integer of 2 to 4, and d is an integer of 10 to 300.

Another preferable embodiment is a compound, of formula (a1), wherein b is 0, c is an integer of 5 to 12, d is an integer of 10 to 300, and e is an integer of 1 to 20. It is preferable that e has such a value that the number of A is 3 to 22 per molecule.

$R^{31}$ and $R^{39}$ are, independently from each other, A as defined above, a substituted or unsubstituted monovalent hydrocarbon group having no (meth)acrylic group, or an alkoxy group. As used herein, the term "(meth)acrylic group" means an acryloyloxy methacryloyloxy group.

The substituted or unsubstituted monovalent hydrocarbon group having no (meth)acrylic group is preferably a substituted or unsubstituted monovalent hydrocarbon group having 1 to 18 carbon atoms, and more preferably an unsubstituted monovalent hydrocarbon group having 1 to 8 carbon atoms. Examples of the monovalent hydrocarbon group include alkyl groups, such as methyl, ethyl, propyl, butyl, pentyl and hexyl groups; cycloalkyl groups, such as cyclohexyl group; aryl groups, such as phenyl, tolyl and naphthyl groups; aralkyl groups, such as benzyl, phenylethyl and phenylpropyl groups; and alkenyl groups, such as vinyl and allyl groups. A part or all of the hydrogen, atoms each bonded to a carbon atom of the aforementioned groups may be substituted with a halogen atom, such as fluorine or chlorine atom. These groups may have an intervening oxygen atom(s). The alkoxy group preferably has 1 to 6 carbon atoms, and more preferably 1 to 4 carbon atoms. Examples of the alkoxy group include methoxy, ethoxy, propoxy, 1-methylethoxy, 1-methylpropoxy, 2-methyl propoxy, pentyloxy, 3-methylbutyloxy, hexyloxy, cyclohexyloxy, and phenoxy groups. Among these, methyl, phenyl, methoxy and ethoxy group are preferred in view of the ease of synthesis.

$R^{32}$-$R^{38}$ are, independently from each other, a substituted or unsubstituted monovalent hydrocarbon group having no (meth)acrylic group, or an alkoxy group. Examples hereof are those mentioned above for $R^{31}$ and $R^{39}$. Methyl, phenyl, methoxy and ethoxy groups are preferred in view of the ease of synthesis.

In formulas (a1) and (a2) above, the siloxane units the parentheses with subscript d and the siloxane units in the parentheses with subscript e may be arranged at random or in blocks. The groups denoted by $R^{30}$-$R^{39}$ are independent from each other, and may be the same or different.

The compound of formula (a1) may be prepared in any method known in the art, and there is no particular limitation on the method of its synthesis. For instance, the compound may be prepared in any of the synthesis methods (1) to (3) described below. The resulting compound typically has distribution in the structures, and b, d and e may be each an average value per molecule.

(1) A method of synthesis by an equilibration reaction of a siloxane oligomer of the following formula (A1), a cyclic siloxane of the following formula (B1), and a disiloxane of the following formula (C1)

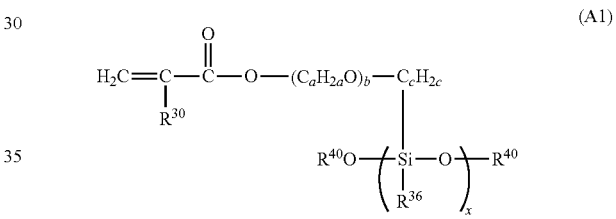

wherein x is an integer of 1 to 100, $R^{40}$ is a monovalent hydrocarbon group having 1 to 8 carbon atoms, and $R^{30}$, $R^{36}$, a, b and c are as defined above.

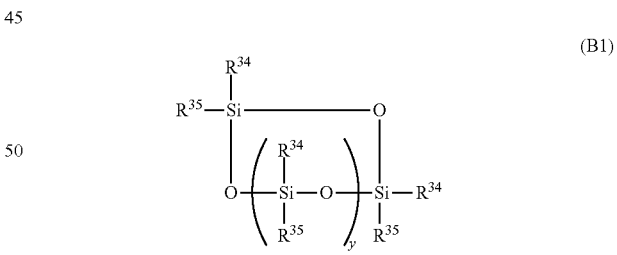

wherein y is an integer of 1 to 3, and $R^{34}$ and $R^{35}$ are as defined above.

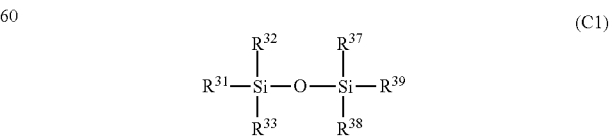

wherein $R^{31}$-$R^{33}$ and $R^{37}$-$R^{39}$ are as defined above.

(2) A method of synthesis by the reaction of a siloxane of formula (A2) shown below with (meth)acryloyl chloride

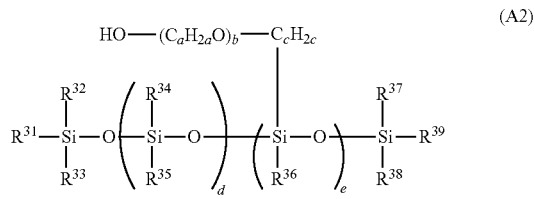

(A2)

wherein $R^{31}$-$R^{39}$ and a to e are as defined above.

A method of synthesis by a hydrosilylation between a hydrogensiloxane of formula (A3) and a compound of formula (B3), each shown below, in the presence of a platinum catalyst.

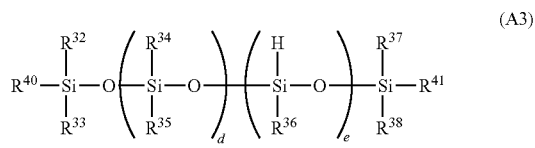

(A3)

wherein $R^{40}$, $R^{41}$ are, independently from each other, a hydrogen atom, a substituted or unsubstituted monovalent hydrocarbon group having no (meth)acrylic group, or an alkoxy group, and $R^{32}$-$R^{38}$, d and e are as defined above.

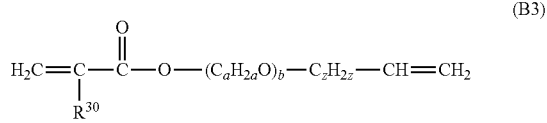

(B3)

wherein z is an integer of 0 to 16; and $R^{30}$, a and b are as defined above.

A reaction temperature and time in each of the methods described above may be suitably set in a manner known in the art. The reaction temperature is preferably in the range of 0 to 100° C., and the reaction time is preferably in the range of 1 to 20 hours. The reaction may be carried out using a suitable solvent in which the starting compounds are solvable. For instance, 2-propyl alcohol or toluene may be used as the solvent. The platinum catalyst may be any conventional one known in the art.

A polymerization inhibitor may be used, if necessary, in each of the aforementioned reactions. The polymerization inhibitor may be any compound conventionally used for (meth)acrylic compounds. For example, phenolic polymerization inhibitors, such as hydroquinone, hydroquinone monomethyl ether, 2-t-butylhydroquinone, 4-methoxyphenol and 2,6-di-t-butyl-4-methylphenol (BHT), may be used. These polymerization inhibitors may be used alone or in combination. Although there is no particular limitation on the amount of the polymerization inhibitor, the amount of the polymerization inhibitor is preferably from 5 to 500 ppm, more preferably from 10 to 200 ppm, relative to the mass of the compound to be obtained.

The siloxane compound according to the invention may be used as an additive for a variety of paints, in particular as an additive for an active energy ray curable paints. The polymerizable monomer according to the invention may be of one and the same structure, or may have a structural distribution (i.e., a mixture of compounds having different values of b, d and e) and may be used as a paint additive. As used herein, the term paint encompasses not only exterior paints for buildings and automobiles, but also printing inks, inks for 3D printing, and topcoat agents for buildings. The paint to which the siloxane compound of the invention is added as an additive may have any composition as known for conventional paints, and may be prepared by any method as known for conventional paints, without any particular limitation.

EXAMPLES

The invention will be further described with reference to the following Examples, Reference Examples and Application Example, which should not to be construed to limit the scope of the present invention.

It is noted that viscosities were measured at 25° C. with a Cannon-Fenske capillary viscometer, and refractive indices were measured at 25° C. with a digital refractometer, RX-7000α (Atago Co. Ltd.). $^1$H-NMR analyses were conducted with JOEL ECX500II (JEOL Ltd.), using $CDCl_3$ as a solvent for measurement.

Example 1

Preparation of Methacrylic-Modified Siloxane Compound (a-1)

A one-liter, four-neck flask, fitted with a condenser and a thermometer, was charged with 560 g of hydrogensiloxane of formula (A3') shown below wherein d is 160 on average and e is 6 on average, and 72 g of a compound of formula (B3') shown below, and then a temperature was raised to 55° C.

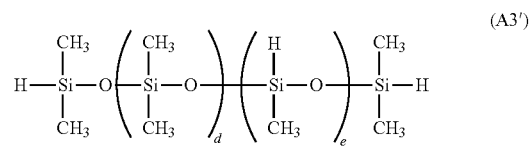

(A3')

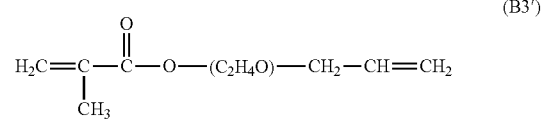

(B3')

To this solution was added 0.40 g of a catalyst solution of alkaline neutralized chloroplatinic acid-vinylsiloxane complex in toluene (platinum content of 0.5% by weight). After allowing the temperature to rise up around 80° C., the solution was held at 80° C. for 3 hours. The product thus obtained had a yield of 619 g, a viscosity of 900 mm$^2$/s, and a refractive index of 1.4124. $^1$H-NMR analysis confirmed that the compound thus obtained was a methacrylic-modified siloxane compound of formula (a-1) shown below. In formula (a-1), the amount of the ($C_2H_4O$) moiety relative to the total weight of the molecule was about 3% by weight.

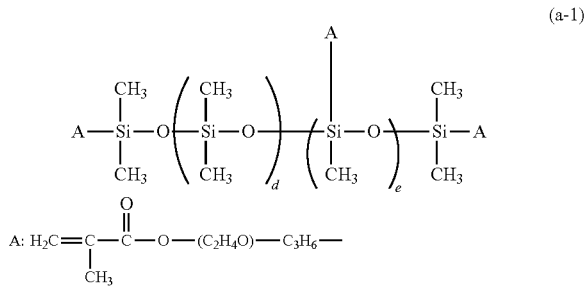

(a-1)

wherein d is 160 on average, and e is 6 on average.

The $^1$H-NMR data of the compound of formula (a-1) were as follows.

$^1$H-NMR: δ −0.18-0.28 (m, 990H), 0.42-0.58 (m, 16H), 1.50-1.71 (m, 16H), 1.77-2.07 (s, 24H), 3.33-3.47 (m, 16H), 3.59-3.71 (m, 16H), 4.21-4.32 (m, 16H), 5.47-5.60 (s, 8H), 6.05-6.17 (s, 8H)

Referential Example 2

Preparation of Methacrylic-Modified Siloxane Compound (a-2)

A one-liter, four-neck flask, fitted with a condenser and a thermometer was charged with 30 g of 1,1,1,3,3,3-hexamethyldisiloxane, 545 g of 1,1,3,3,5,5,7,7-octamethylcyclotetrasiloxane, and 226 g of 8-methacryloyloxyoctylmethyl dimethoxysilane oligomer (viscosity: 140 mm$^2$/s). Then, 1.6 g of trifluoromethane sulfonic acid was added and allowed to react at 60° C. for 4 hours. After completion of the reaction, the liquid temperature was lowered to 40° C., followed by the addition of 9.6 g of KYOWAAD® 500SH (Kyowa Chemical Industry Co., Ltd). After stirred for 1 hour, solids were removed by filtration. Then, 0.24 g of BHT was added, and low-boiling components were removed over 3 hours at 100° C./10 torr while blowing a nitrogen gas containing 4% oxygen. The product thus obtained had a yield of 690 g, a viscosity of 280 mm$^2$/s, and a refractive index of 1.4169. The $^1$H-NMR analysis confirmed that the compound thus obtained was a methacrylic-modified siloxane compound of formula (a-2) shown below.

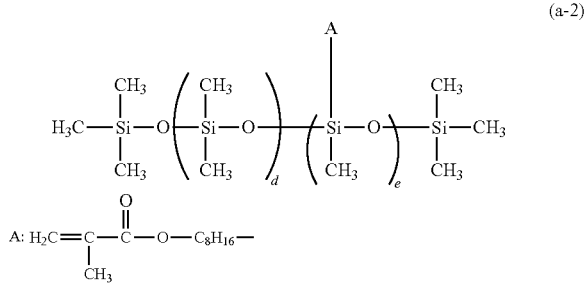

(a-2)

wherein d is 80 on average, and e is 10 on average.

The $^1$H-NMR data of the compound of formula (a-2) were as follows.

$^1$H-NMR: δ−0.15-0.25 (m, 528H), 0.43-0.60 (m, 20H), 1.22-1.40 (m, 100H), 1.58-1.71 (m, 20H), 1.86-2.01 (s, 30H), 4.07-4.19 (m, 20H), 5.49-5.56 (s, 10H), 6.03-6.11 (s, 10H)

Example 3

Preparation of Methacrylic-Modified Siloxane Compound (a-3)

The procedures of Example 1 were repeated, except that the starting materials were replaced with 546 g of hydrogensiloxane of formula (A3') shown above wherein d is 120 on average and e is, however, 4 on average, and 80 g of a compound of formula (B3") shown below.

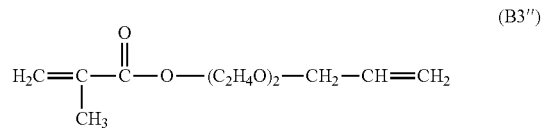

(B3")

The product thus obtained had a yield of 610 g, a viscosity 780 mm$^2$/s, and a refractive index of 1.4156. The $^1$H-NMR analysis confirmed that the compound thus obtained was a methacrylic-modified siloxane compound of formula (a-3) shown below in formula (a-3), the amount of the (C$_2$H$_4$O) moiety relative to the total weight of the molecule was about 5% by weight.

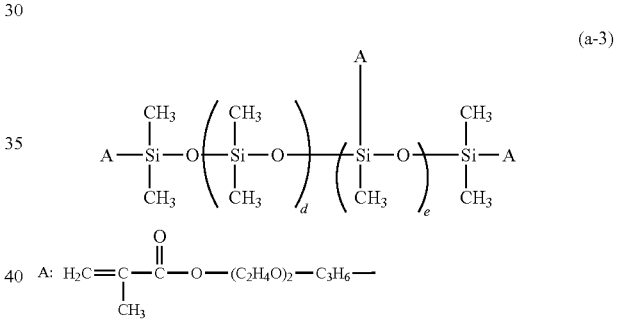

(a-3)

wherein d is 120 on, average, and e is 4 on average.

The $^1$H-NMR data of the compound of formula (a-3) were as follows.

$^1$H-NMR: δ−0.15-0.28 (m, 744H), 0.43-0.58 (m, 12H), 1.51-1.69 (m, 12H), 1.78-2.05 (s, 18H), 3.33-3.47 (m, 12H), 3.61-3.71 (m, 24H), 4.21-4.30 (m, 24H), 5.49-5.59 (s, 6H), 6.06-6.17 (s, 6H)

Reference Example 1

Preparation of Methacrylic-Modified Siloxane Compound (r-1)

The procedures of Referential Example 2 were repeated, except that 170 g of 3-methacryloyloxypropylmethyldimethoxysilane (viscosity: 80 mm$^2$/s) was used in place of the 8-methacryloyloxyoctylmethyldimethoxysilane oligomer. The $^1$H-NMR analysis confirmed that the compound thus obtained was a methacrylic-modified siloxane compound of formula (r-1). The product thus obtained had a yield of 640 g, a viscosity of 250 mm$^2$/s, and a refractive index of 1.4192.

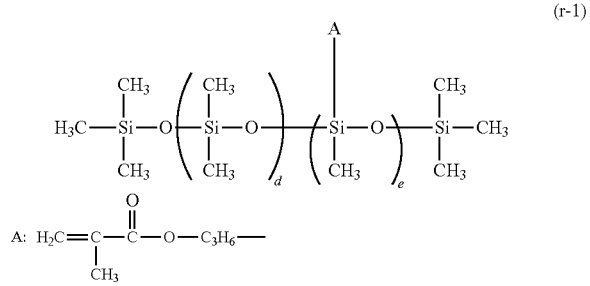

(r-1)

wherein d is 80 on average, and e is 10 on average.

Reference Example 2

Preparation of Methacrylic-Modified Siloxane Compound (r-2)

The procedures of Example 1 were repeated, except that the starting materials were replaced with 395 g of hydrogensiloxane of formula (A3') shown above wherein d is, however, 100 on average and e is 6 on average, and 235 g of a compound of formula (B3''') shown below.

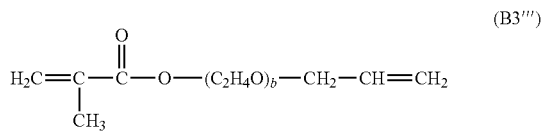

(B3''')

wherein b is 10 on average.

The $^1$H-NMR analysis confirmed that the compound thus obtained was a methacrylic-modified siloxane compound of formula (r-2) The product thus obtained had a yield of 620 g, a viscosity of 3,200 mm$^2$/s, and a refractive index of 1.451. In formula (r-2), the amount of the (C$_2$H$_4$O) moiety relative to the total weight of the molecule was about 20% by weight.

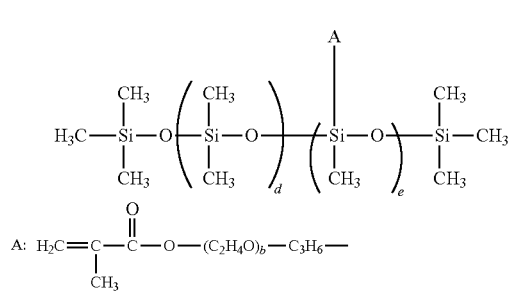

(r-2)

wherein b is 10 on average, d is 100 on average, and is 6 on average.

Application Example

Inks containing each of the methacrylic-modified siloxane compounds obtained above were prepared and subjected to various evaluations.
<Preparation of Ink A>

Twenty nine parts by weight of a pigment dispersion (containing 17.5 wt. % of carbon black, 6.5 wt. % of a pigment dispersant (Solsperse™ 32000, Lubrizol), and 76 wt. % of dipropylene glycol diacrylate), 25 parts by weight of dipropylene glycol diacrylate, 25 parts by weight of 2-(2-vinyloxyethoxy)ethyl acrylate, 10 parts by weight of 2,4,6-trimethylbenzoyl-diphenylphosphine oxide, 4 parts by weight of 2-(dimethyl amino)-2-[(4-methylphenyl)methyl]-1-[4-(4-morpholinyl)phenyl]-1-butanone, 3 parts by weight of dipentaerythritol hexaacrylate, 2 parts by weight of 2-isopropylthioxanthone, and 2 parts by weight of the methacrylic-modified siloxane compound (a-1) were combined with stirring and thoroughly mixed, and then filtered through a membrane filter with a pore size of 1 μm to obtain Ink A.
<Preparation of Inks B to F>

The procedures for preparing Ink A were repeated except that the methacrylic-modified siloxane compound (a-1) was replaced by the methacrylic-modified siloxane compound (a-2), (a-3), (r-1) or (r-2) or a poly ether-modified silicone having no (moth) acrylic group (KF-353, Shin-Etsu Chemical Co., Ltd.), to obtain Inks B to F, respectively.
<Evaluation of the Inks>

Each of inks A to F was applied to an OK TOPCCAT+ paper (Oji Paper Co., Ltd.) to a thickness of about 6 μm, and cured using two 120 W/cm high-pressure mercury lamps at an irradiation dose of 200 mJ/cm$^2$. The coatings thus obtained were evaluated for leveling, defoaming and bleeding properties as described below. The results are shown in Table 1 below.

Leveling property: The surface condition of the coating was visually inspected.

G: good;

M: unevenness observed on a part of the surface;

B: unevenness observed over the entire surface.

Defoaming property: The coating surface was visually inspected for the presence or absence of bubbles.

G: no bubble observed on the surface;

B: bubble observed on the surface.

Bleeding property: The coating surface was evaluated by touch feeling.

G: no sliminess felt on the surface;

B: sliminess felt on the surface.

TABLE 1

| | Ink A | Ink B | Ink C | Ink D | Ink E | Ink F |
|---|---|---|---|---|---|---|
| Additive | (a-1) | (a-2) | (a-3) | (r-1) | (r-2) | KF-353 |
| Leveling property | G | G | G | B | G | M |
| Defoaming property | G | G | G | G | B | G |
| Bleeding property | G | G | G | G | G | B |

As shown in Table 1, the inks containing the methacrylic-modified siloxane compound according to the invention show the good leveling property and no bleeding. The compound also provides an ink with a good defoaming property.

INDUSTRIAL APPLICABILITY

The (meth)acrylic-modified siloxane compound of the invention provides an ink with a good leveling property. It also provides an ink with good leveling and defoaming properties. The (meth)acrylic-modified siloxane compound of the invention is useful as an additive for paints.

The invention claimed is:

1. A (meth)acrylic-modified siloxane compound of the following formula (a1):

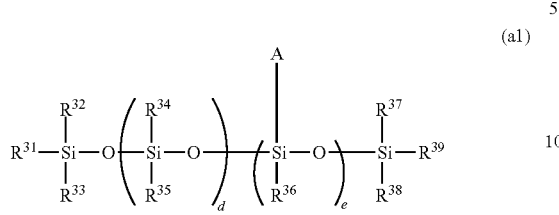

(a1)

wherein A is a group of the following formula (a2):

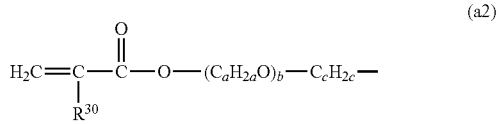

(a2)

wherein $R^{30}$ is a hydrogen atom or a methyl group; a is an integer of 2 to 5; b is an integer of 1 to 20; and c is an integer of 2 to 15;

wherein d is an integer of 1 to 500; e is an integer of 1 to 30; $R^{31}$ and $R^{39}$ are, independently from each other, an alkoxy group, A as defined above, or a substituted or unsubstituted monovalent hydrocarbon group having no (meth)acrylic group; $R^{32}$-$R^{38}$ are, independently from each other, a substituted or unsubstituted monovalent hydrocarbon group having no (meth)acrylic group, or an alkoxy group, with the proviso that e is an integer of 3 to 30 when none of $R^{31}$ and $R^{39}$ is A, and the number of A is 5 to 20 per molecules in the formula (a1).

2. The (meth)acrylic-modified siloxane compound according to claim 1, wherein b is an integer of 1 to 20, c is an integer of 3 to 12, and e is an integer of 1 to 20, provided that e is such an integer that the number of A is 5 to 20 per molecule.

3. The (meth)acrylic-modified siloxane compound according to claim 1 or 2, wherein a is an integer of 2 to 4, and d is an integer of 10 to 300.

4. The (meth)acrylic-modified siloxane compound according to claim 1, wherein an amount of the oxyalkylene moiety of the formula —$(C_aH_{2a}O)_b$— in the whole molecule is less than 25% by weight.

5. An additive for paint, composed of the (meth)acrylic-modified siloxane compound according to claim 1.

6. The (meth)acrylic-modified siloxane compound according to claim 1, wherein b is 2 or 3.

7. An additive for paint, composed of the (meth)acrylic-modified siloxane compound according to claim 6.

8. A paint selected from exterior paints for buildings and automobiles, printing inks, inks for 3D printing, and topcoat agents for buildings, which comprises the (meth)acrylic-modified siloxane compound according to claim 1.

9. The (meth)acrylic-modified siloxane compound according to claim 1, wherein:
$R^{32}$-$R^{38}$ are each —$CH_3$,
$R^{31}$ and $R^{39}$ are each A,
d is 10~300, and
e is 1~20.

10. The (meth)acrylic-modified siloxane compound according to claim 9, wherein A is

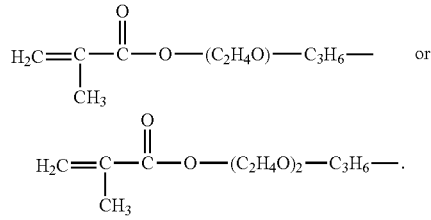

11. An additive for paint, comprised of the (meth)acrylic-modified siloxane compound according to claim 9.

12. A paint selected from exterior paints for buildings and automobiles, printing inks, inks for 3D printing, and topcoat agents for buildings, which comprises the (meth)acrylic-modified siloxane compound according to claim 9.

13. An additive for paint, comprised of the (meth)acrylic-modified siloxane compound according to claim 10.

14. A paint selected from exterior paints for buildings and automobiles, printing inks, inks for 3D printing, and topcoat agents for buildings, which comprises the (meth)acrylic-modified siloxane compound according to claim 10.

15. A (meth)acrylic-modified siloxane compound of the following formula (a1):

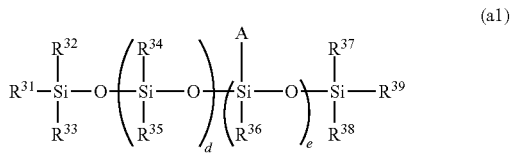

(a1)

wherein A is a group of the following formula (a2):

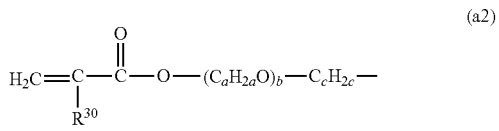

(a2)

wherein $R^{30}$ is a hydrogen atom or a methyl group; a is an integer of 2 to 5; b is an integer of 1 to 20; and c is an integer of 2 to 15; wherein d is an integer of 1 to 500; e is an integer of 1 to 30; $R^{31}$ and $R^{39}$ are each A as defined above; $R^{32}$-$R^{38}$ are, independently from each other, a substituted or unsubstituted monovalent hydrocarbon group having no (meth)acrylic group, or an alkoxy group.

* * * * *